United States Patent
Liu et al.

(10) Patent No.: US 10,034,279 B2
(45) Date of Patent: Jul. 24, 2018

(54) POWER CONTROL METHOD, SYSTEM, DEVICE AND COMPUTER STORAGE MEDIUM

(71) Applicant: ZTE CORPORATION, Shenzhen, Guangdong Province (CN)

(72) Inventors: Lu Liu, Shenzhen (CN); Tao Liu, Shenzhen (CN); Meiying Wang, Shenzhen (CN)

(73) Assignee: XI'AN ZHONGXING NEW SOFTWARE CO., LTD., Xi'An, Shaanxi (CN)

( * ) Notice: Subject to any disclaimer, the term of this patent is extended or adjusted under 35 U.S.C. 154(b) by 105 days.

(21) Appl. No.: 15/028,716

(22) PCT Filed: Jun. 12, 2014

(86) PCT No.: PCT/CN2014/079718
§ 371 (c)(1),
(2) Date: Apr. 12, 2016

(87) PCT Pub. No.: WO2014/180440
PCT Pub. Date: Nov. 13, 2014

(65) Prior Publication Data
US 2016/0278051 A1    Sep. 22, 2016

(30) Foreign Application Priority Data
Oct. 15, 2013 (CN) .......................... 2013 1 0481630

(51) Int. Cl.
*H04W 72/04* (2009.01)
*H04W 52/48* (2009.01)
(Continued)

(52) U.S. Cl.
CPC ......... *H04W 72/042* (2013.01); *H04L 1/1812* (2013.01); *H04W 52/283* (2013.01);
(Continued)

(58) Field of Classification Search
CPC .... H04L 1/1812; H04L 1/0026; H04L 1/1671
See application file for complete search history.

(56) References Cited

U.S. PATENT DOCUMENTS 8,780,875 B2 * 7/2014 Hsu .................. H04L 1/0007
370/328

FOREIGN PATENT DOCUMENTS

CN    101026396 A    8/2007
CN    101366305 A    2/2009
(Continued)

OTHER PUBLICATIONS

XP050103488; Support of CPC feature; 3GPP TSG WG1 Meeting #47, Riga, Latvia, Nov. 6-10, 2016; R1-063560; 25.124 V7.2.0 (Sep. 2006); Siemens et al.
(Continued)

*Primary Examiner* — Chandrahas B Patel
(74) *Attorney, Agent, or Firm* — Ling Wu; Stephen Yang; Ling and Yang Intellectual Property

(57) ABSTRACT

The present document provides a power control method, system, device and computer storage medium, wherein the method includes, when it is determined that a preset entry condition is met, a base station notifying a user equipment (UE) to disable a dedicated physical control channel (DPCCH) transmission during a deactivated hybrid automatic repeat request (HARQ) process (101); when it is determined that a preset exit condition is met, the base station notifying the UE to enable the DPCCH transmission (102) in a deactivated HARQ process.

20 Claims, 2 Drawing Sheets

(51) Int. Cl.
*H04W 52/44* (2009.01)
*H04L 1/18* (2006.01)
*H04W 52/28* (2009.01)
*H04W 52/32* (2009.01)

(52) U.S. Cl.
CPC .......... *H04W 52/44* (2013.01); *H04W 52/48* (2013.01); *H04W 52/325* (2013.01)

(56) References Cited

FOREIGN PATENT DOCUMENTS

| TW | 200947938 A1 | 11/2009 |
|----|--------------|---------|
| WO | 2008023241 A2 | 2/2008 |
| WO | 2009149282 A1 | 12/2009 |

OTHER PUBLICATIONS

QUALCOMM Europe, Signalling in support of DTX/DRX, 3GPP TSG-RAN WG1 #45, May 8-12, 2006, Shanghai, China, R1-061498, XP050102347.

\* cited by examiner

POWER CONTROL METHOD, SYSTEM, DEVICE AND COMPUTER STORAGE MEDIUM

TECHNICAL FIELD

The present document relates to power control technologies, and more particularly, to a power control method, system, device, and computer storage medium.

BACKGROUND OF THE RELATED ART

Uplink dedicated physical channels of High Speed Uplink Packet Access (HSUPA) service in the Universal Mobile Telecommunications System (UMTS) comprise: Dedicated Physical Control Channel (DPCCH), E-DCH dedicated physical Control channel (E-DPCCH) and E-DCH dedicated physical data channel (E-DPDCH), wherein, the DPCCH mainly provides control information such as Pilot, Transmission Power Control (TPC), transport format combination Indicator (TFCI) and FBI; the E-DPCCH is mainly responsible for transmitting the control part of the HSUPA service, and the E-DPDCH is mainly responsible for transmitting the data part of the HSUPA service. The existing 3GPP protocol specifies that, the UE comprises eight Hybrid Automatic Repeat Request (HAR) processes to transmit data. When an HARQ process is in the activated state and the HARQ process transmits uplink scheduling data in the E-DPDCH, the E-DPCCH and the DPCCH will transmit control information accordingly; and when an HARQ process is in the deactivated state and the HARQ process does not transmit uplink data in the E-DPDCH, the E-DPCCH does not transmit control information, but the DPCCH continues transmitting control information, which will bring additional interference, reduce uplink system capacity, and reduce standby time of the terminal.

SUMMARY

To solve the technical problems in the related art, the embodiment of the present document provides a power control method, system, device, and computer storage medium to increase uplink capacity, reduce uplink interference, and increase standby time of a user equipment (UE).

To achieve the abovementioned object, the technical solution of the embodiment of the present document is implemented as follows:

the embodiment of the present document provides a power control method, wherein the method comprises:

when determining that a preset entry condition is met, a base station notifying a user equipment (UE) to disable a DPCCH transmission in a deactivated HARQ process;

when determining that a preset exit condition is met, the base station notifying the UE to enable a DPCCH transmission in a deactivated HARQ process.

Preferably, before determining that the preset entry condition is met, the method further comprises:

the base station monitoring information of the UE and information of a cell where the UE is located.

Preferably, the information of the UE comprises at least one of the following information: capability information of the UE, HSUPA service type information of the UE, information of an activated HARQ process or information of a deactivated HARQ process included in the UE.

Preferably, the capability information of the UE comprises information of whether the UE has a capability of disabling the DPCCH transmission in a deactivated HARQ process;

the HSUPA service type information of the UE comprises: information of a service whose Transport Time Interval (TTI) is 2 microseconds in the HSUPA or information of a service whose TTI is 10 microseconds in the HSUPA.

Preferably, the information of the cell where the UE is located comprises: Rise Over Thermal (ROT) information of the cell or overload rate information of the cell.

Preferably, said determining that a preset entry condition is met is:

determining that both the information of the UE and the information of the cell where the UE is located meet the preset entry condition;

Accordingly, said determining that a preset exit condition is met is:

determining that both the information of the UE and the information of the cell where the UE is located meet the preset exit condition.

Preferably, said determining that both the information of the UE and the information of the cell where the UE is located meet the preset entry condition comprises:

when monitoring that the UE has the capability of disabling the DPCCH transmission in a deactivated HARQ process, the UE has a deactivated HARQ process, and the service type of the UE is a service whose TTI is 2 microseconds in the HSUPA, and monitoring that the ROT information of the cell where the UE is located is greater than preset target ROT information, determining that both the information of the UE and the information of the cell where the UE located meet the preset entry condition.

Preferably, said determining that both the information of the UE and the information of the cell where the UE is located meet the preset entry condition comprises:

when monitoring that the UE has the capability of disabling the DPCCH transmission in a deactivated HARQ process, the UE has a deactivated HARQ process, and the service type of the UE is a service whose TTI is 2 microseconds in the HSUPA, and monitoring that the overload rate information of the cell where the UE is located is greater than preset target overload rate information, determining that both the information of the UE and the information of the cell where the UE located meet the preset entry condition.

Preferably, the base station notifying the UE to disable or enable the DPCCH transmission in a Deactivated HARQ process comprises:

the base station notifying the UE to disable or enable the DPCCH transmission in a deactivated HARQ process via a downlink high speed shared control channel order (HS-SCCH order).

The embodiment of the present document further provides a base station, wherein, the base station comprises: a determining unit and a transmitting unit; wherein, the determining unit is configured to determine whether a preset entry condition or preset exit condition is met;

the transmitting unit is configured to: when a determination result of the determining unit is that the preset entry condition is met, notify a user equipment (UE) to disable a DPCCH transmission in a deactivated HARQ process; when the determination result of the determining unit is that the preset exit condition is met, notify the UE to disable a DPCCH transmission in a deactivated HARQ process.

Preferably, the base station further comprises a monitoring unit configured to monitor information of the UE and information of a cell where the UE is located.

Preferably, the information of the UE comprises at least one of the following information: capability information of the UE, HSUPA service type information of the UE, information of an activated HARQ process or information of a deactivated HARQ process included in the UE; wherein the capability information of the UE comprises information of whether the UE has a capability of disabling the DPCCH transmission in a deactivated HARQ process;

the HSUPA service type information of the UE comprises: information of a service whose Transport Time Interval (TTI) is 2 microseconds in the HSUPA or information of a service whose TTI is 10 microseconds in the HSUPA.

Preferably, the information of the cell where the UE is located comprises: Rise Over Thermal (ROT) information of the cell or overload rate information of the cell.

Preferably, the determining unit is configured to determine whether both the information of the UE and the information of the cell where the UE is located meet the preset entry condition or the preset exit condition;

preferably, the determining unit is further configured to: when the monitoring unit monitors that the UE has the capability of disabling the DPCCH transmission in a deactivated HARQ process, the UE has a deactivated HARQ process, and the service type of the UE is a service whose TTI is 2 microseconds in the HSUPA, and monitors that the ROT information of the cell where the UE is located is greater than preset target ROT information, determine that both the information of the UE and the information of the cell where the UE located meet the preset entry condition.

Preferably, the determining module is configured to: when the monitoring unit monitors that the UE has the capability of disabling the DPCCH transmission in a deactivated HARQ process, the UE has a deactivated HARQ process, and the service type of the UE is a service whose TTI is 2 microseconds in the HSUPA, and the monitoring unit monitors that the overload rate information of the cell where the UE is located is greater than preset target overload rate information, determine that both the information of the UE and the information of the cell where the UE is located meet the preset entry condition.

Preferably, the transmitting unit is further configured to transmit a downlink high speed shared control channel order (HS-SCCH order) to notify the UE to disable or enable the DPCCH transmission in a deactivated HARQ process.

The embodiment of the present document further provides a power control system, wherein the system comprises: a base station and a user equipment (UE); wherein, the base station is configured to: when determining that a preset entry condition is met, notify a user equipment (UE) to disable a DPCCH transmission in a deactivated HARQ process; when determining that a preset exit condition is met, notify the UE to enable a DPCCH transmission in a deactivated HARQ process;

the UE is configured to disable or enable the DPCCH transmission in a deactivated HARQ process based on a notification order transmitted by the base station.

Preferably, the base station is further configured to: before determining that the preset entry condition is met, monitor information of the UE and information of a cell where the UE is located.

Preferably, the base station is configured to: when determining that both the information of the UE and the information of the cell where the UE is located meet the preset entry condition, notify the user equipment (UE) to disable the DPCCH transmission in a deactivated HARQ process; when determining that both the information of the UE and the information of the cell where the UE is located meet the preset exit condition, notify the UE to enable the DPCCH transmission in a deactivated HARQ process.

Preferably, the base station is configured to: when monitoring that the UE has a capability of disabling the DPCCH transmission in a deactivated HARQ process, the UE has a deactivated HARQ processes, and a service type of the UE is a service whose TTI is 2 microseconds in the HSUPA, and monitoring that ROT information of the cell where the UE is located is greater than preset target ROT information, determine that both the information of the UE and the information of the cell where the UE located meet the preset entry condition.

Preferably, the base station is configured to: when monitoring that the UE has a capability of disabling the DPCCH transmission in a deactivated HARQ process, the UE has a deactivated HARQ process, and the service type of the UE is a service whose TTI is 2 microseconds in the HSUPA, and monitoring that overload rate information of the cell where the UE is located is greater than preset target overload rate information, determine that both the information of the UE and the information of the cell where the UE located meet the preset entry condition.

Preferably, the base station is configured to notify the UE to disable or enable the DPCCH transmission in a deactivated HARQ process via a downlink high speed shared control channel order (HS-SCCH order).

The embodiment of the present document further provides a computer storage medium, wherein the computer storage medium stores computer-executable commands, the computer-executable commands are used for executing the power control method according to the embodiment of the present document.

With the power control method, system, device and computer storage medium provided in the embodiment of the present document, when determining that the preset entry condition is met, the base station notifies the UE to disable the DPCCH transmission in the deactivated HARQ process, when determining that the preset exit condition is met, the base station notifies the UE to enable the DPCCH transmission in the deactivated HARQ process, thus, the UE disables the DPCCH transmission in the deactivated HARQ process, thereby reducing the uplink interference and increasing the system uplink capacity, and by disabling the DPCCH transmission, the UE energy consumption is reduced and the standby time of the UE is increased.

PREFERRED EMBODIMENTS

In various embodiments of the present document, in the HSUPA system, the UE can be classified into UEs whose TTI is 2 ms and UEs whose TTI is 10 ms according to the TTI; in a UE whose TTI is 2 ms, the existing protocol specifies that the UE comprises eight HARQ processes to transmit data. The base station (Node B) can obtain the activated/deactivated state of each HARQ process of the UE, when an HARQ process is in the deactivated state, the HARQ process cannot be used for transmitting scheduling data. Therefore, the base station can monitor information of the UE and information of the cell where the UE is located; when both the information of the UE and the information of the cell where the UE is located meet the preset condition, the UE is notified to disable the DPCCH transmission in the deactivated process to reduce the uplink interference, thereby increasing the system uplink capacity and increasing the standby time of the terminal.

Hereinafter, in conjunction with the accompanying drawings and specific embodiments, the present document will be described in further detail.

Figure 1:
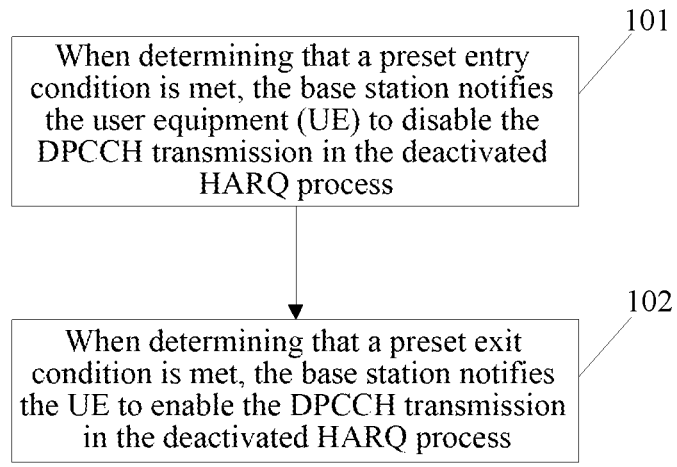
FIG. 1 is a flow chart of a power control method in accordance with an embodiment of the present document.

FIG. 1 is a flow chart of the power control method in accordance with an embodiment of the present document, as shown in FIG. 1, it comprises the following steps:

in step 101, when determining that a preset entry condition is met, the base station notifies the user equipment (UE) to disable the DPCCH transmission in the deactivated HARQ process.

Herein, by monitoring information of the UE and information of the cell where the UE is located, the base station determines whether the preset entry condition is met based on the information of the UE and the information of the cell where the UE is located.

Wherein, the information of the UE comprises at least one of the following information: capability information of the UE, HSUPA service type information of the UE, information of an activated HARQ process or information of a deactivated HARQ process included in the UE.

Wherein, the capability information of the UE comprises information of whether the UE has the capability of disabling the DPCCH transmission in the deactivated HARQ process;

the HSUPA service type information of the UE comprises: information of a service whose Transport Time Interval (TTI) is 2 ms in the HSUPA or a service whose TTI is 10 ms in the HSUPA.

Wherein, the information of the cell where the UE is located comprises: ROT information of the cell or overload rate information of the cell.

In the present embodiment, the base station can notify the UE to disable the DPCCH transmission in the deactivated HARQ process via a downlink high speed shared control channel order (HS-SCCH order) when determining that the preset entry condition is met.

Preferably, said determining that a preset entry condition is met is:

determining that both the information of the UE and the information of the cell where the UE is located meet the preset entry condition.

Specifically, said determining that both the information of the UE and the information of the cell where the UE is located meet the preset entry condition comprises:

when monitoring that the UE has the capability of disabling the DPCCH transmission in the deactivated HARQ process, the UE has the deactivated HARQ process, and the service type of the UE is a service whose TTI is 2 ms in the HSUPA, and monitoring that the ROT information of the cell where the UE is located is greater than preset target ROT information, determining that both the information of the UE and the information of the cell where the UE located meet the preset entry condition.

OR, said determining that both the information of the UE and the information of the cell where the UE is located meet the preset entry condition comprises:

when monitoring that the UE has the capability of disabling the DPCCH transmission in the deactivated HARQ process, the UE has the deactivated HARQ process, and the service type of the UE is a service whose TTI is 2 ms in the HSUPA, and monitoring that overload rate information of the cell where the UE is located is greater than preset target overload rate information, determining that both the information of the UE and the information of the cell where the UE is located meet the preset entry condition.

Wherein, the base station notifying the UE to disable the DPCCH transmission in the deactivated HARQ process comprises:

the base station notifying the UE to disable the DPCCH transmission in the deactivated HARQ process via a downlink HS-SCCH order.

in step 102: when determining that a preset exit condition is met, the base station notifies the UE to enable the DPCCH transmission in the deactivated HARQ process.

Herein, by monitoring the information of the UE and the information of the cell where the UE is located, the base station determines whether the information of the UE and the information of the cell where the UE is located meet the preset exit condition based on the information of the UE and the information of the cell where the UE is located; wherein, the information of the UE and the information of the cell where the UE is located have been described in the step 101 and will not be repeated herein.

Specifically, said determining that both the information of the UE and the information of the cell where the UE is located meet the preset exit condition comprises:

when monitoring that the UE has the capability of disabling the DPCCH transmission in the deactivated HARQ process, the UE has the deactivated HARQ process, and the service type of the UE is the service whose TTI is 2 ms in the HSUPA, and monitoring that the ROT information of the cell where the UE is located is less than the preset target ROT information, determining that both the information of the UE and the information of the cell where the UE located meet the preset exit condition;

OR, when monitoring that the UE has the capability of disabling the DPCCH transmission in the deactivated HARQ process, the UE has the deactivated HARQ process, and the service type of the UE is the service whose TTI is 2 ms in the HSUPA, and monitoring that the overload rate information of the cell where the UE is located is less than the preset target overload rate information, determining that both the information of the UE and the information of the cell where the UE located meet the preset exit condition.

In the present embodiment, the base station notifies the UE to enable the DPCCH transmission in the deactivated HARQ process via a downlink HS-SCCH order when determining that the preset exit condition is met.

Figure 2:
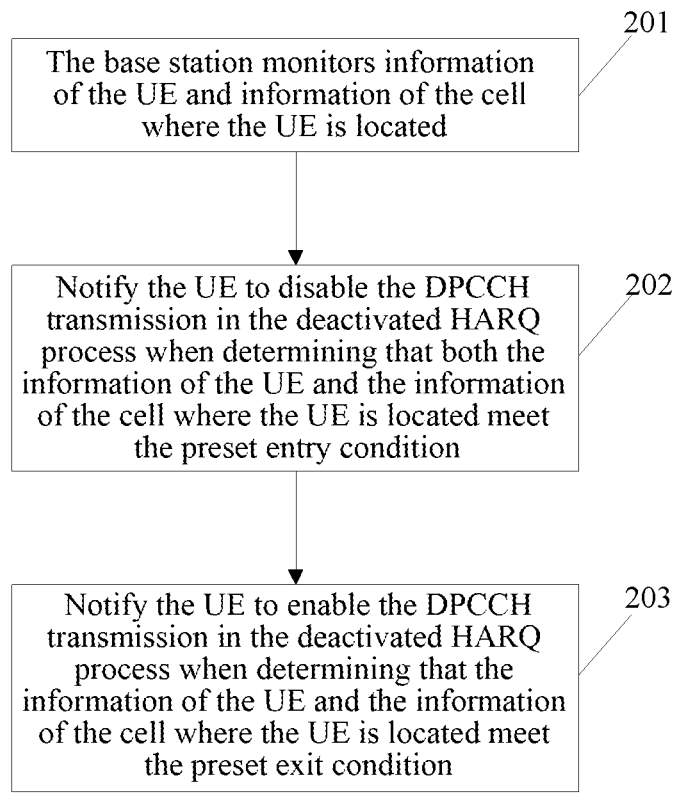
FIG. 2 is a flow chart of the power control method in accordance with another embodiment of the present document.

FIG. 2 is a flow chart of the power control method in accordance with another embodiment of the present document; as shown in FIG. 2, it comprises the following steps:

in step 201, the base station monitors information of the UE and information of the cell where the UE is located.

Herein, the information of the UE comprises: capability information of the UE, HSUPA service type information of the UE, information of an activated HARQ process or information of a deactivated HARQ process included in the UE; wherein, wherein, the capability information of the UE comprises information of whether the UE has the capability of disabling the DPCCH transmission in the deactivated HARQ process;

the HSUPA service type information of the UE comprises: information of a service whose TTI is 2 ms in the HSUPA or a service whose TTI is 10 ms in the HSUPA.

Wherein, the information of the cell where the UE is located comprises: the ROT information of the cell or the overload rate information of the cell.

Specifically, the base station receives the capability information reported by the UE, and the capability information comprises information of whether the UE has the capability of disabling the DPCCH transmission in the deactivated HARQ process, the HSUPA service type information of the UE and the process information of the UE, and the base station obtains the service type information configured by the network side device for the UE, comprising: a service whose TTI is 2 ms in the HSUPA or a service whose TTI is 10 ms in the HSUPA, and obtains the process information of the UE configured by the network side device for the UE, comprising: information of the activated HARQ process or information of the deactivated HARQ process; for example, in the HSUPA, in the eight HARQ processes of the HSUPA 2 ms TTI UE configured by the network side, the process 0 and the process 1 are configured as activated HARQ processes, and the process 2 to the process 7 are configured as deactivated HARQ processes.

In step 202, it is to notify the UE to disable the DPCCH transmission in the deactivated HARQ process when determining that both the information of the UE and the information of the cell where the UE is located meet the preset entry condition.

Wherein, said determining that both the information of the UE and the information of the cell where the UE is located meet the preset entry condition comprises:

when monitoring that the UE has the capability of disabling the DPCCH transmission in the deactivated HARQ process, the UE has the deactivated HARQ process, and the service type of the UE is the service whose TTI is 2 ms in the HSUPA, and monitoring that the ROT information of the cell where the UE is located is greater than the preset target ROT information, determining that both the information of the UE and the information of the cell where the UE is located meet the preset condition;

or, when monitoring that the UE has the capability of disabling the DPCCH transmission in the deactivated HARQ process, the UE has the deactivated HARQ process, and the service type of the UE is the service whose TTI is 2 ms in the HSUPA, and monitoring that the overload rate information of the cell where the UE is located is greater than the preset target overload rate information, determining that both the information of the UE and the information of the cell where the UE is located meet the preset entry condition.

In the present document, the base station notifies the UE to disable the DPCCH transmission in the deactivated HARQ process via a downlink HS-SCCH order, i.e., notifying that the deactivated HARQ process in the UE is in the DPCCH disabled mode. Specifically, the base station notifying the UE to disable the DPCCH transmission in the deactivated HARQ process via a downlink HS-SCCH order needs to modify a content of the downlink HS-SCCH order in the 3GPP protocol 25.212, and add at least one order type and define the meaning of bits in the order. One protocol modification implementation way is as follows:

If the extended Order type xeodt,1, xeodt,2='11' and the Order type xodt,1, xodt,2, xodt,3='100', then the mapping for xord,1, xord,2, xord,3 is according to subclause 4.6C.2.2.5.

...

4.6C.2.2.5 Orders for activation and deactivation of DPCCH OFF operation

If the order is transmitted from the serving HS-DSCH cell or a secondary serving HS-DSCH cell, for this Order type, xord,1, xord,2, xord,3 is comprised of:

Reserved (2 bits): xord,1, xord,2=xres,2

DPCCH OFF operation activation (1 bit): xord,3=xdpcch-off,1

If xdpcch-off, 1='0' then the HS-SCCH order is a DPCCH OFF operation De-activation order.

If xdpcch-off, 1='1' then the HS-SCCH order is a DPCCH OFF operation Activation order.

If the order is transmitted from a non-serving cell using HS-SCCH type 1 specified in subclause 4.6.1 and xord,1, xord,2, xord,3='000', then it is an HS-DSCH serving cell change order.

Other combinations of xord,1, xord,2, xord,3 are reserved (not used in this release).

...

In the abovementioned implementation way, the present embodiment adds a new order type: (xeodt, 1, xeodt,2="11", xodt,1, xodt,2, xodt,3="100", xord,1, xord,2, xord, 3="xxx"); wherein, xeodt,1, xeodt,2="11", xodt,1, xodt,2, xodt,3="100", in other 3-bit order bits, the xord,1 and the xord,2, a total of 2 bits, are reserved, and the remaining xord,3="1" indicates notifying the UE to disable the DPCCH transmission in the deactivated HARQ process; xord,3="0" indicates notifying the UE to enable the DPCCH transmission in the deactivated HARQ process. Thus, the base station notifies the UE to disable the DPCCH transmission in the deactivated HARQ process via the downlink HS-SCCH order (xeodt,1, xeodt,2="11", xodt,1, xodt,2, xodt,3="100", xord,1, xord,2, xord,3="xx1").

In step 203, when determining that the information of the UE and the information of the cell where the UE is located meet the preset exit condition, it is to notify the UE to enable the DPCCH transmission in the deactivated HARQ process.

Wherein, said determining that both the information of the UE and the information of the cell where the UE is located meet the preset exit condition comprises:

when monitoring that the UE has the capability of disabling the DPCCH transmission in the deactivated HARQ process, the UE has the deactivated HARQ process, and the service type of the UE is the service whose TTI is 2 ms in the HSUPA, and monitoring that the ROT information of the cell where the UE is located is less than the preset target ROT information, determining that both the information of the UE and the information of the cell where the UE is located meet the preset entry condition;

or, when monitoring that the UE has the capability of disabling the DPCCH transmission in the deactivated HARQ process, the UE has the deactivated HARQ process, and the service type of the UE is the service whose TTI is 2 ms in the HSUPA, and monitoring that the overload rate information of the cell where the UE is located is less than the preset target overload rate information, determining that both the information of the UE and the information of the cell where the UE is located meet the preset exit condition.

In the present embodiment, similar to the step 202, the base station notifying the UE to enable the DPCCH transmission in the deactivated HARQ process via a downlink HS-SCCH order type needs to modify the content of the downlink HS-SCCH order in the 3GPP protocol 25.212, and add one new order type: (xeodt, 1, xeodt,2="11", xodt,1, xodt,2, xodt,3="100", xord,1, xord,2, xord,3="xxx"); wherein, xeodt,1, xeodt,2="11", xodt,1, xodt,2, xodt, 3="100", in other 3-bit order bits, the xord, 1 and the xord,2, a total of 2 bits, are reserved, and the remaining xord,3="1" indicates notifying the UE to disable the DPCCH transmission in the deactivated HARQ process; xord,3="0" indicates notifying the UE to enable the DPCCH transmission in the deactivated HARQ process. Thus, the base station notifies the UE to enable the DPCCH transmission in the deactivated HARQ process via the downlink HS-SCCH order (xeodt,1, xeodt,2="11", xodt,1, xodt,2, xodt,3="100", xord,1, xord,2, xord,3="xx0").

Below, in conjunction with specific embodiments, the present document will be described in further detail.

The First Embodiment

Suppose that there are two HSUPA UEs in the cell, and both the UEs are UEs with TTI being 2 ms, and both UEs have the capability of disabling the DPCCH transmission in the deactivated HARQ process. The Node B monitors that the activated HARQ processes of the UE1 are {0,1}, the deactivated HARQ processes are {2,3,4,5,6,7}. All the HARQ processes of the UE2 are activated, and there is no deactivated HARQ process.

The Node B (base station) detects the ROT of the cell. When the Node B monitors that the RoT is greater than the preset cell target RoT+DetaRoT_up in consecutive t1 seconds, it illustrates that the uplink load of the cell is relatively large. In order to reduce the uplink interference and to reduce the uplink load of the cell, the Node B notifies the UE1 to disable the DPCCH transmission in the deactivated HARQ process via the downlink HS-SCCH order (xeodt,1, xeodt,2="11", xodt,1, xodt,2, xodt,3="100", xord,1, xord,2, xord,3="xx1"). For the UE2 without a deactivated HARQ process, the Node B does not send a notification. The t1 and the DetaRoT_up are experimental or test values.

Figures 3, 4, 5:
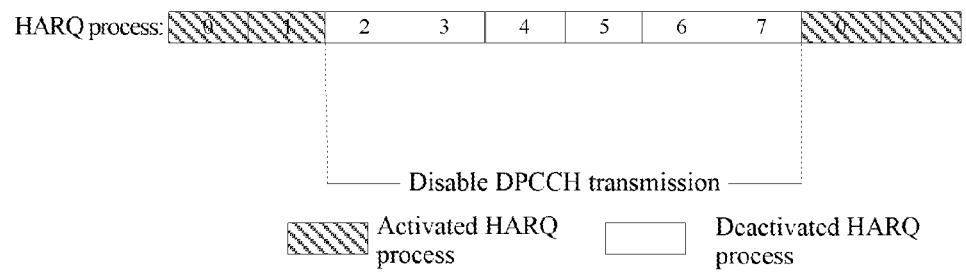
FIG. 3 is a schematic diagram of a UE disabling a DPCCH transmission in a deactivated HARQ process in accordance with another embodiment of the present document.
FIG. 4 is a schematic diagram of the UE enabling the DPCCH transmission in a deactivated HARQ process in accordance with another embodiment of the present document.
FIG. 5 is a schematic diagram of the structure of a base station in accordance with an embodiment of the present document.

FIG. 3 is a schematic diagram of the UE disabling the DPCCH transmission in the deactivated HARQ process in the embodiment of the present document; as shown in FIG. 3, the process 0 and the process 1 are activated HARQ processes, and the process 2 to the process 7 are deactivated HARQ processes, when the UE1 receives the downlink HS-SCCH order (xeodt,1, xeodt,2="11", xodt,1, xodt,2, xodt,3="100", xord,1, xord,2, xord,3="xx1") transmitted by the Node B to notify the UE1 to disable the DPCCH transmission in the deactivated HARQ process, the DPCCH transmission is disabled in the process 2 to the process 7, and the process 0 and the process 1 remain in the DPCCH transmission enabled state.

The Second Embodiment

Suppose that there are two HSUPA UEs in the cell, and both the UEs are UEs with TTI being 2 ms, and both UEs have the capability of disabling the DPCCH transmission in the Deactivated HARQ process. The Node B monitors that the activated HARQ processes of the UE1 are {0,1}, the deactivated HARQ processes are {2,3,4,5,6,7}, and the DPCCH transmissions in the processes 2 to 7 are disabled. All the HARQ processes of the UE2 are activated, and there is no deactivated HARQ process.

The Node B detects the ROT of the cell. When the Node B monitors that the RoT is less than the preset cell target RoT+DetaRoT_down in consecutive t2 seconds, it illustrates that the uplink load of the cell is relatively low. The Node B notifies the UE1 to enable the DPCCH transmission in the deactivated HARQ process via the downlink HS-SCCH order (xeodt,1, xeodt,2="11", xodt,1, xodt,2, xodt, 3="100", xord,1, xord,2, xord,3="xx0"). For the UE2 without the deactivated HARQ process, the Node B does not send the notification. The t2 and the DetaRoT_up are experimental or test values.

FIG. 4 is a schematic diagram of the UE enabling the DPCCH transmission in the deactivated HARQ process in the embodiment of the present document; as shown in FIG. 4, the process 0 and the process 1 are activated HARQ processes, the process 2 to process 7 are deactivated HARQ processes, when the UE1 receives the downlink HS-SCCH order (xeodt,1, xeodt,2="11", xodt,1, xodt,2, xodt,3="100", xord,1, xord,2, xord,3="xx0") transmitted by the Node B to notify the UE1 to enable the DPCCH transmission in the deactivated HARQ process that is originally in the DPCCH transmission disabled state, then the DPCCH transmission is enabled in the process 2 to the process 7, while the process 0 and the process 1 remain in the DPCCH transmission enabled state.

Based on the abovementioned method, the embodiment of the present document further provides a base station, FIG. 5 is a schematic diagram of the structure of the base station in accordance with an embodiment of the present document, as shown in FIG. 5, the base station comprises: a determining unit 51 and a transmitting unit 52; wherein, the determining unit 51 is configured to determine whether the preset entry condition or preset exit condition is met;

the transmitting unit 52 is configured to: when a determination result of the determining unit is that the preset entry condition is met, notify the user equipment (UE) to disable the DPCCH transmission in the deactivated HARQ process; when the determination result of the determining unit 51 is that the preset exit condition is met, notify the UE to disable the DPCCH transmission in the deactivated HARQ process.

Preferably, the base station further comprises a monitoring unit 53, configured to monitor information of the UE and information of the cell where the UE is located.

Wherein, the information of the UE comprises at least one of the following information: capability information of the UE, HSUPA service type information of the UE, information of an activated HARQ process or information of a deactivated HARQ process included in the UE; wherein the capability information of the UE comprises information of whether the UE has the capability of disabling the DPCCH transmission in the deactivated HARQ process;

the HSUPA service type information of the UE comprises: information of a service whose TTI is 2 ms in the HSUPA or a service whose TTI is 10 ms in the HSUPA.

Wherein, the information of the cell where the UE is located comprises: the ROT information of the cell or the overload rate information of the cell.

Preferably, the determining unit 51 is configured to determine whether both the information of the UE and the information of the cell where the UE is located meet the preset entry condition or the preset exit condition;

Preferably, the determining unit 51 is further configured to: when the monitoring unit 53 monitors that the UE has the capability of disabling the DPCCH transmission in the deactivated HARQ process, the UE has the deactivated HARQ process, and the service type of the UE is the service whose TTI is 2 ms in the HSUPA, and the monitoring unit 53 monitors that the ROT information of the cell where the UE is located is greater than the preset target ROT information, determine that both the information of the UE and the information of the cell where the UE is located meet the preset entry condition.

Accordingly, the determining module 51 is further configured to: when the monitoring unit 53 monitors that the UE has the capability of disabling the DPCCH transmission in the deactivated process, the UE has the deactivated HARQ process, and the service type of the UE is the service whose TTI is 2 ms in the HSUPA, and when the monitoring unit 53 monitors that the ROT information of the cell where the UE is located is less than the preset target ROT information, determine that both the information of the UE and the information of the cell where the UE is located meet the preset exit condition.

Preferably, the determining unit 51 is further configured to: when the monitoring unit 53 monitors that the UE has the capability of disabling the DPCCH transmission in the deactivated HARQ process, the UE has the deactivated HARQ process, and the service type of the UE is the service whose TTI is 2 ms in the HSUPA, and the monitoring unit 53 monitors that the overload rate information of the cell where the UE is located is greater than the preset target overload rate information, determine that both the information of the UE and the information of the cell where the UE is located meet the preset entry condition.

Accordingly, the determining module 51 is further configured to: when the monitoring unit 53 monitors that the UE has the capability of disabling the DPCCH transmission in the deactivated HARQ process, the UE has the deactivated HARQ process, and the service type of the UE is the service whose TTI is 2 ms in the HSUPA, and when the monitoring unit 53 monitors that the overload rate information of the cell where the UE is located is less than the preset target overload rate information, determine that both the information of the UE and the information of the cell where the UE is located meet the preset exit condition.

Preferably, the transmitting unit 52 is further configured to transmit a downlink high speed shared control channel order (HS-SCCH order) to notify the UE to disable or enable the DPCCH transmission in the deactivated HARQ process.

Those skilled in the art should understand, that the functions of each processing unit in the base station in accordance with the embodiment of the present document can be understood by referring to the related description of the abovementioned power control method, various processing units in the base station according to the embodiment of the present document may be implemented via analog circuits implementing the functions in the embodiment of the present document, or implemented by running the software that implements the functions of the embodiment of the present document in an intelligent terminal.

Wherein, the determining unit 51 and the monitoring unit 53 in the base station according to the present embodiment can be achieved with the Central Processing Unit (CPU), or Digital Signal Processor (DSP), or Field-programmable gate array (FPGA) in the base station in practical applications; the transmitting unit 52 in the base station can be achieved with the transmitter in the base station in practical applications.

The embodiment of the present document further provides a power control system, wherein the system comprises: the base station and the user equipment (UE) according to the embodiment of the present document; wherein, the base station is configured to: when determining that the preset entry condition is met, notify the user equipment (UE) to disable the DPCCH transmission in the deactivated HARQ process; when determining that the preset exit condition is met, notify the UE to enable the DPCCH transmission in the deactivated HARQ process;

the UE is configured to disable or enable the DPCCH transmission in the deactivated HARQ process based on the notification order transmitted by the base station.

Wherein, the base station is further configured to: before determining that the preset entry condition is met, monitor information of the UE and information of the cell where the UE is located.

Wherein, the base station is configured to: when determining that the information of the UE and the information of the cell where the UE is located meet the preset entry condition, notify the UE to disable the DPCCH transmission in the deactivated HARQ process; when determining that the information of the UE and the information of the cell where the UE is located meet the preset exit condition, notify the UE to enable the DPCCH transmission in the deactivated HARQ process.

Specifically, the base station is configured to: when monitoring that the UE has the capability of disabling the DPCCH transmission in the deactivated HARQ process, the UE has the deactivated HARQ process, and the service type of the UE is the service whose TTI is 2 ms in the HSUPA, and monitoring that the ROT information of the cell where the UE is located is greater than the preset target ROT information, determine that both the information of the UE and the information of the cell where the UE is located meet the preset entry condition.

Specifically, the base station is configured to: when monitoring that the UE has the capability of disabling the DPCCH transmission in the deactivated HARQ process, the UE has deactivated HARQ process, and the service type of the UE is the service whose TTI is 2 ms in the HSUPA, and monitoring that the overload rate information of the cell where the UE is located is greater than the preset target overload rate information, determine that both the information of the UE and the information of the cell where the UE is located meet the preset entry condition.

In the present embodiment, the base station is configured to notify the UE to disable or enable the DPCCH transmission in the deactivated HARQ process via the downlink high speed shared control channel order (HS-SCCH order).

Those skilled in the art should appreciate that, the embodiments of the present document may be provided as a method, an apparatus, a device, or a computer program product. Accordingly, the present document can be forms of hardware embodiments, software embodiments, or embodiments combining software with hardware. Moreover, the present document can be the form of computer program products implemented in one or more computer usable storage mediums having computer usable program codes (including but not limited to disk memory and optical memory, etc.).

The present document has been described by referring to the flow charts and/or block diagrams of the method, apparatus, device and computer program product in accordance with the embodiment of the present document. It should be understood that computer program commands should be used to implement each procedure and/or block in the flow charts and/or the block diagrams, as well as combinations of the procedures and/or the blocks in the flow charts and/or the block diagrams. These computer program commands may be provided to a general purpose computer, a special purpose computer, an embedded processor or a processor of another programmable data processing device to produce a machine, thus a device implementing the functions specified in one or more flows in the flow charts and/or one or more blocks in the block diagrams is generated through the commands executed by the computer or the processor of another programmable data processing apparatus.

These computer program commands may also be stored in a computer-readable memory that can direct a computer or another programmable data processing device to work in a particular manner, such that the commands stored in the computer readable memory produce manufactured goods including a command device, and the command device achieves the functions specified in one or more flows in the flow charts and/or one or more blocks in the block diagrams.

These computer program commands may also be loaded in a computer or another programmable data processing device, so that the computer or the other programmable device implements a series of operating steps to produce the processing procedures implemented by the computer, thus the commands executed in the computer or the other programmable device provide steps for achieving the functions specified in one or more flows in the flow charts and/or one or more blocks in the block diagrams.

The above description is only embodiments of the present document, and it should be noted that, for those ordinary skilled in the art, under the premise of not departing from the principles in the embodiment of the present document, a number of improvements and modifications can be made, and these improvements and modifications should also be considered as within the protection scope of the embodiments of the present document.

INDUSTRIAL APPLICABILITY

With the embodiment of the present document, when determining that the preset entry condition is met, the base station notifies the UE to disable the DPCCH transmission in the deactivated HARQ process, when determining that the preset exit condition is met, the base station notifies the UE to enable the DPCCH transmission in the deactivated HARQ process, thus the UE can disable the DPCCH transmission in the deactivated HARQ process, thereby reducing the uplink interference and increasing the system uplink capacity, and by disabling the DPCCH transmission, the UE energy consumption is reduced and the standby time of the UE is increased.

What is claimed is:

1. A power control method, wherein, the method comprises:
    when determining that a preset entry condition is met, a base station notifying a user equipment (UE) to disable a dedicated physical control channel (DPCCH) transmission in a deactivated hybrid automatic repeat request (HARQ) process;
    when determining that a preset exit condition is met, the base station notifying the UE to enable a DPCCH transmission in a deactivated HARQ process;
    the determining that a preset entry condition is met is:
    determining that both the information of the UE and the information of the cell where the UE is located meet the preset entry condition, wherein the information of the cell where the UE is located comprises Rise Over Thermal (ROT) information of the cell;
    wherein said determining that both the information of the UE and the information of the cell where the UE is located meet the preset entry condition comprises:
    when monitoring that the ROT information of the cell where the UE is located is greater than preset target ROT information, determining that both the information of the UE and the information of the cell where the UE located meet the preset entry condition.

2. The method of claim 1, wherein, before determining that the preset entry condition is met, the method further comprises:
    the base station monitoring information of the UE and information of a cell where the UE is located.

3. The method of claim 2, wherein, the information of the UE comprises at least one of the following information: capability information of the UE, High Speed Uplink Packet Access (HSUPA) service type information of the UE, information of an activated HARQ process or information of a deactivated HARQ process included in the UE.

4. The method of claim 3, wherein,
    the capability information of the UE comprises information of whether the UE has a capability of disabling the DPCCH transmission in a deactivated HARQ process;
    the HSUPA service type information of the UE comprises:
    information of a service whose Transport Time Interval (TTI) is 2 microseconds in the HSUPA or information of a service whose TTI is 10 microseconds in the HSUPA.

5. The method of claim 2, wherein, the information of the cell where the UE is located further comprises: overload rate information of the cell.

6. The method of claim 1, wherein,
    said determining that a preset exit condition is met is:
    determining that both the information of the UE and the information of the cell where the UE is located meet the preset exit condition.

7. The method of claim 1, wherein, said determining that both the information of the UE and the information of the cell where the UE is located meet the preset entry condition further comprises:
    when monitoring that the UE has the capability of disabling the DPCCH transmission in a deactivated HARQ process, the UE has a deactivated HARQ process, and the service type of the UE is a service whose TTI is 2 microseconds in the HSUPA, determining that both the information of the UE and the information of the cell where the UE located meet the preset entry condition.

8. A non-transitory computer readable storage medium, wherein, the non-transitory computer readable storage medium stores computer-executable commands, the computer-executable commands are used for executing the power control method of claim 1.

9. The method of claim 1, wherein, the base station notifying the UE to disable or enable the DPCCH transmission in a deactivated HARQ process comprises:
    the base station notifying the UE to disable or enable the DPCCH transmission in a deactivated HARQ process via a downlink high speed shared control channel order (HS-SCCH order).

10. A base station, wherein, the base station comprises: a determining unit and a transmitting unit; wherein,
    the determining unit is configured to determine whether a preset entry condition or preset exit condition is met;
    the transmitting unit is configured to: when a determination result of the determining unit is that the preset entry condition is met, notify a user equipment (UE) to disable a DPCCH transmission in a deactivated HARQ process; when the determination result of the determining unit is that the preset exit condition is met, notify the UE to disable a DPCCH transmission in a deactivated HARQ process;

wherein the information of the cell where the UE is located comprises Rise Over Thermal (ROT) information of the cell;

wherein the determining unit is further configured to determine whether both the information of the UE and the information of the cell where the UE is located meet the preset entry condition; wherein the determining unit is further configured to: when the monitoring unit monitors that the ROT information of the cell where the UE is located is greater than preset target ROT information, determine that both the information of the UE and the information of the cell where the UE located meet the preset entry condition.

11. The base station of claim 10, wherein, the base station further comprises a monitoring unit configured to monitor information of the UE and information of a cell where the UE is located.

12. The base station of claim 11, wherein, the information of the UE comprises at least one of the following information: capability information of the UE, HSUPA service type information of the UE, information of an activated HARQ process or information of a deactivated HARQ process included in the UE; wherein the capability information of the UE comprises information of whether the UE has a capability of disabling the DPCCH transmission in a deactivated HARQ process;

the HSUPA service type information of the UE comprises: information of a service whose Transport Time Interval (TTI) is 2 microseconds in the HSUPA or information of a service whose TTI is 10 microseconds in the HSUPA.

13. The base station of claim 10, wherein, the transmitting unit is further configured to transmit a downlink high speed shared control channel order (HS-SCCH order) to notify the UE to disable or enable the DPCCH transmission in a deactivated HARQ process.

14. The base station of claim 10, wherein, the determining unit is further configured to determine whether both the information of the UE and the information of the cell where the UE is located meet the preset exit condition.

15. The base station of claim 14, wherein, the determining unit is further configured to: when the monitoring unit monitors that the UE has the capability of disabling the DPCCH transmission in a deactivated HARQ process, the UE has a deactivated HARQ process, and the service type of the UE is a service whose TTI is 2 microseconds in the HSUPA, determine that both the information of the UE and the information of the cell where the UE located meet the preset entry condition.

16. A power control system, wherein the system comprises: a base station and a user equipment (UE); wherein, the base station is configured to: when determining that a preset entry condition is met, notify a user equipment (UE) to disable a DPCCH transmission in a deactivated HARQ process; when determining that a preset exit condition is met, notify the UE to enable a DPCCH transmission in a deactivated HARQ process;

the UE is configured to disable or enable the DPCCH transmission in a deactivated HARQ process based on a notification order transmitted by the base station;

wherein the base station is configured to: when monitoring that Rise Over Thermal (ROT) information of the cell where the UE is located is greater than preset target ROT information, determine that both the information of the UE and the information of the cell where the UE located meet the preset entry condition.

17. The system of claim 16, wherein, the base station is further configured to: before determining that the preset entry condition is met, monitor information of the UE and information of a cell where the UE is located.

18. The system of claim 17, wherein, the base station is configured to: when determining that both the information of the UE and the information of the cell where the UE is located meet the preset entry condition, notify the user equipment (UE) to disable the DPCCH transmission in a deactivated HARQ process; when determining that both the information of the UE and the information of the cell where the UE is located meet the preset exit condition, notify the UE to enable the DPCCH transmission in a deactivated HARQ process.

19. The system of claim 18, wherein, the base station is further configured to: when monitoring that the UE has a capability of disabling the DPCCH transmission in a deactivated HARQ process, the UE has a deactivated HARQ process, and a service type of the UE is a service whose TTI is 2 microseconds in the HSUPA, determine that both the information of the UE and the information of the cell where the UE located meet the preset entry condition.

20. The system of claim 16, wherein, the base station is configured to notify the UE to disable or enable the DPCCH transmission in a deactivated HARQ process via a downlink high speed shared control channel order (HS-SCCH order).

* * * * *